Sept. 4, 1945.　　　　C. G. STRANDLUND　　　　2,384,406
PLOW
Filed Aug. 30, 1943　　　　4 Sheets-Sheet 1
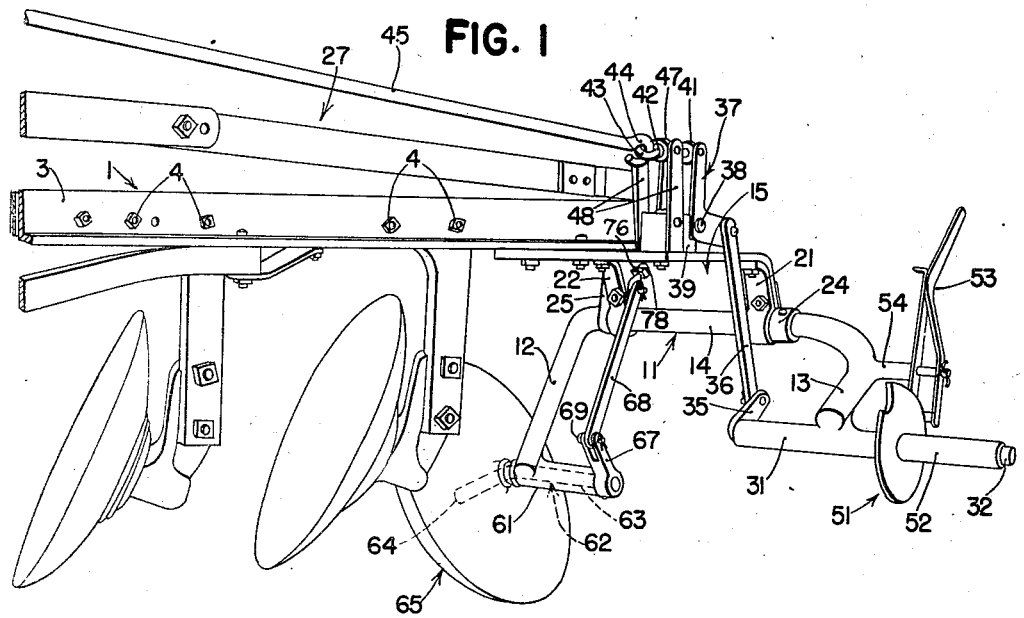
FIG. 1
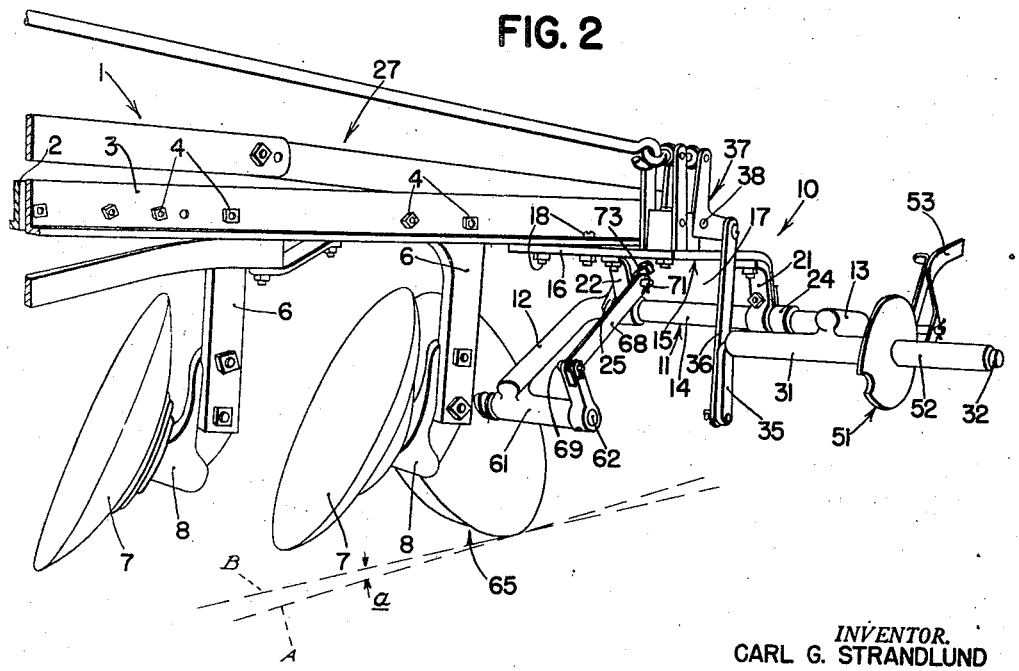
FIG. 2
*INVENTOR.*
CARL G. STRANDLUND
BY 
ATTORNEYS Sept. 4, 1945. C. G. STRANDLUND 2,384,406
PLOW
Filed Aug. 30, 1943 4 Sheets-Sheet 2
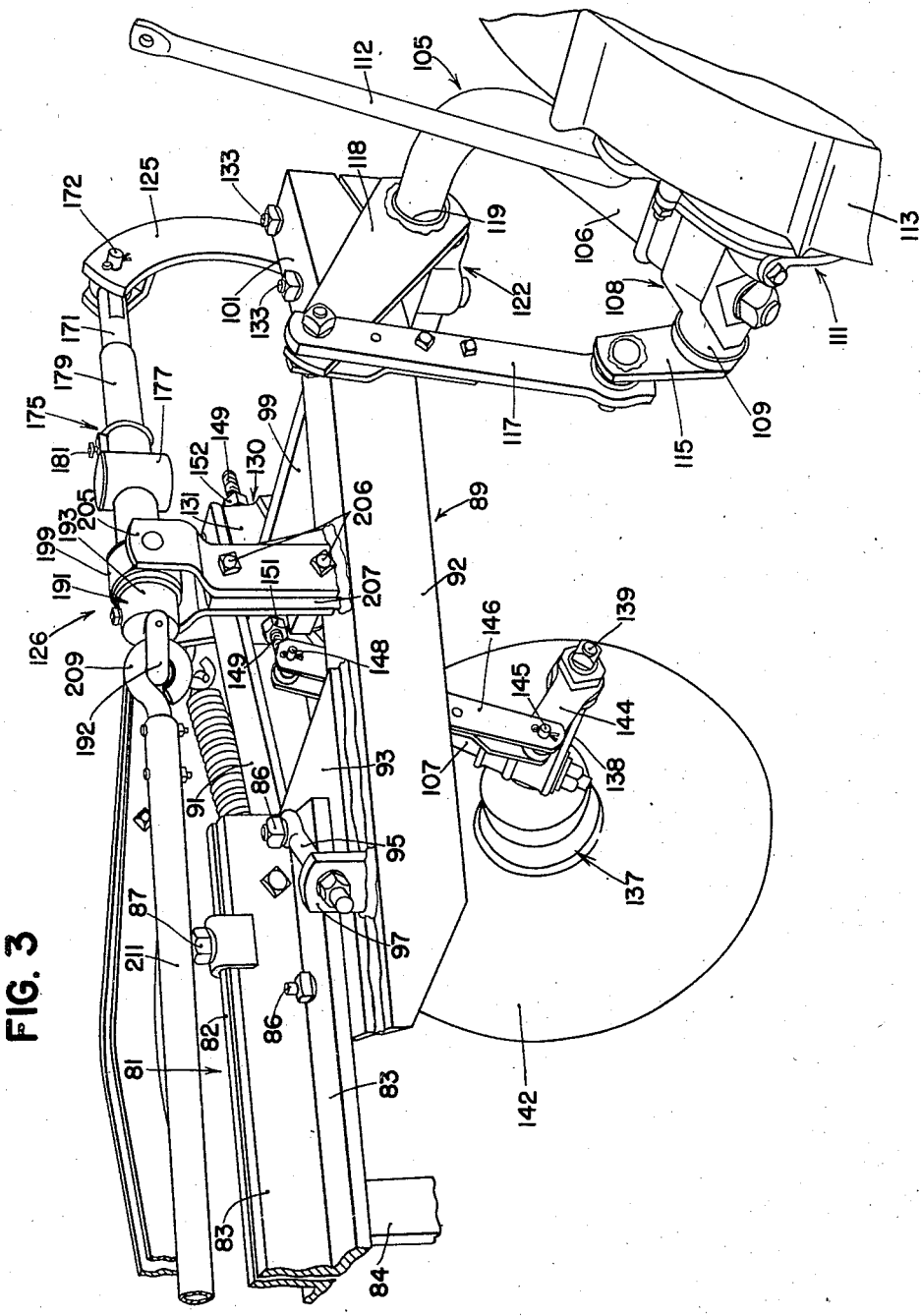
FIG. 3
INVENTOR.
CARL G. STRANDLUND
BY 
ATTORNEYS

INVENTOR.
CARL G. STRANDLUND
ATTORNEYS

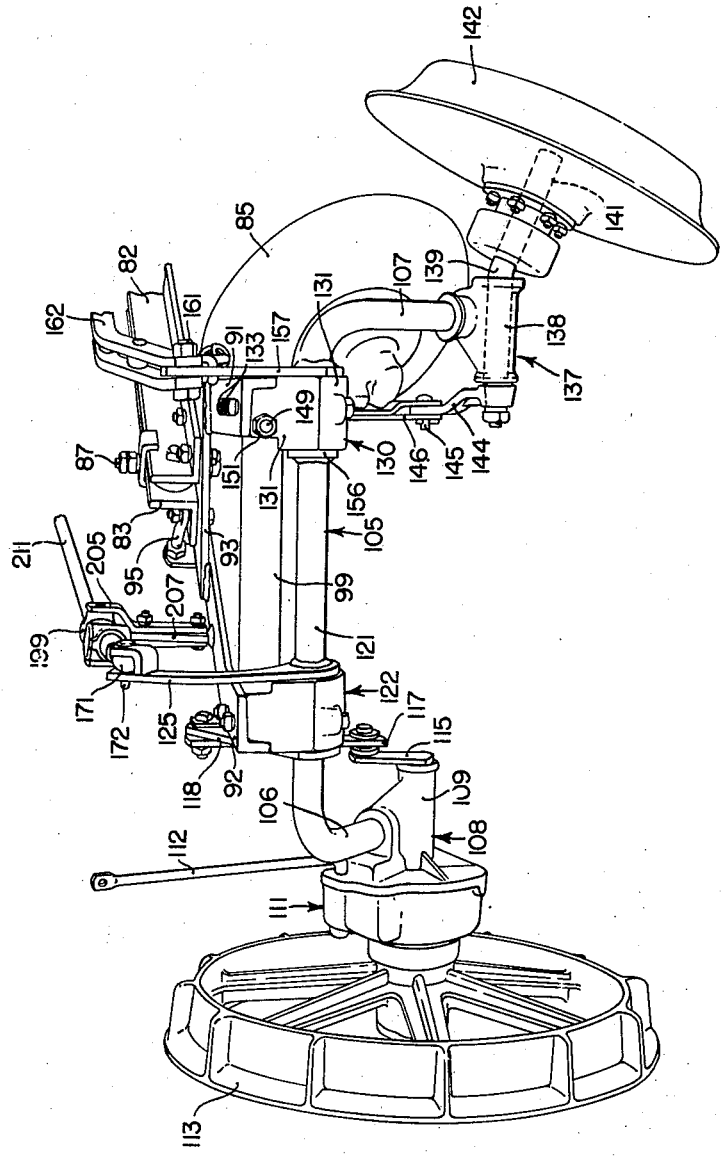

Patented Sept. 4, 1945

2,384,406

UNITED STATES PATENT OFFICE 2,384,406

PLOW

Carl G. Strandlund, Moline, Ill., assignor to Deere & Company, Moline, Ill., a corporation of Illinois Application August 30, 1943, Serial No. 500,728

15 Claims. (Cl. 97—103)

The present invention relates generally to plows and more particularly to disk plows.

The object and general nature of the present invention is the provision of a new and improved disk plow in which the rear end construction is materially simplified and in which the cost of manufacture, as compared with prior plows of comparable size, is materially reduced. More particularly, it is a feature of this invention to provide a new and improved rear end construction for disk plows in which only a single rear crank axle is required but in which the amount of lead and inclination of the rear furrow wheel, required to hold the rear end in the proper position, is provided, together with all necessary adjustments. Heretofore, plows of this type have generally been constructed with two separate crank axles, one for the rear furrow wheel and one for the land wheel. Another feature of the present invention is the provision of new and improved means for adjusting the position of the crank axle, particularly in connection with a traction driven power lift clutch.

These and other objects and advantages of the present invention will be apparent to those skilled in the art after a consideration of the following detailed description, taken in conjunction with the accompanying drawings.

In the drawings:

Figure 1 is a perspective view of the rear end of a disk plow in which the principles of the present invention have been incorporated, the plow being shown in its lifted or transport position.

Figure 2 is a view similar to Figure 1 but showing the plow in its operating or lowered position.

Figure 3 is a view similar to Figure 1 but showing a modified form of the present invention.

Figure 5 is a rear view of the plow shown in Figure 3.

Figure 4:
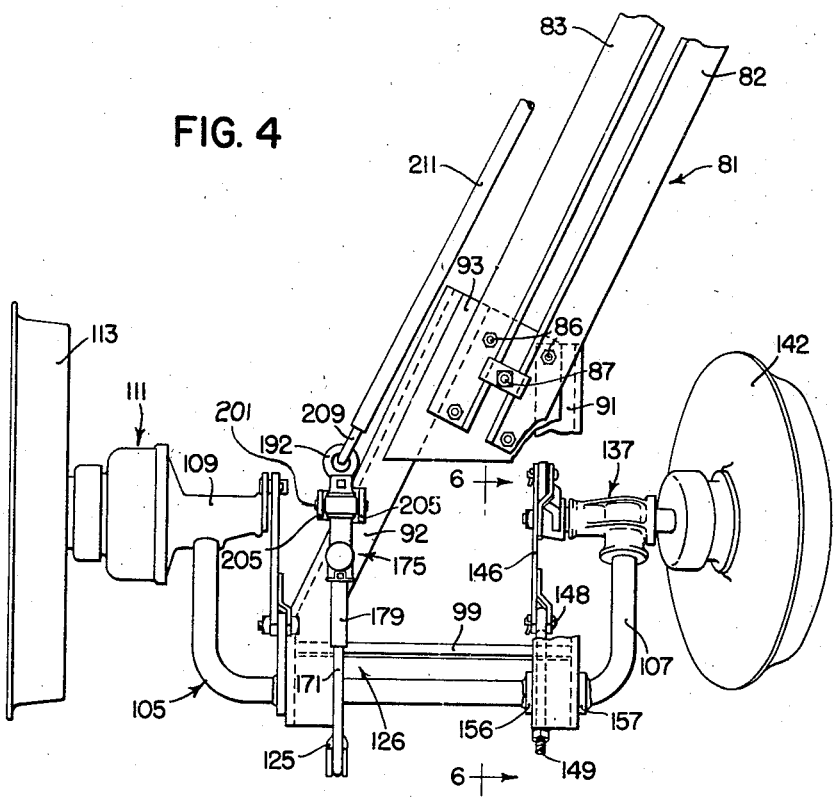
Figure 4 is a plan view of the rear end of the plow shown in Figure 3.

Referring now to the drawings, more particularly to Figures 1 and 2, the frame or support of the plow is indicated in its entirety by the reference numeral 1 and includes a beam construction comprising a pair of angle members 2 and 3 (Figure 2) which are fixed together, as by bolts 4, and which have vertical flanges spaced apart a distance sufficient to receive therebetween a plurality of disk standards 6 on the lower ends of which disk furrow openers 7 are rotatably mounted by bearing constructions 8 of any suitable design. Each of the standards 6 is of generally L-shaped formation, which provides a forward extension suitably apertured to receive a pair of the bolts 4 whereby each standard is rigidly secured to the frame or beam 1.

The rear end construction of the plow is indicated in its entirety by the reference numeral 10 and includes a one-piece crank axle 11 which is preferably formed by bending a bar of round stock into the desired shape. The rear crank axle 11 includes two crank sections 12 and 13 which are disposed in planes lying at an angle to one another, and an intermediate or shaft section 14. The latter section is connected with the rear end of the frame or beam 1 for rocking motion relative thereto about a fixed axis. To this end, a plate member 15 having a horizontal section 16 and a downwardly extending section 17, is bolted, as at 18, to the rear ends of the beam angles 2 and 3. Preferably, the plate member 15 is pivoted on one of the bolts while the other bolts are received in arcuate slots whereby, by loosening the bolts, the horizontal angle between the plate member 15 and the frame 1 may be adjusted for hard, soft, and medium soil conditions. This adjustment is similar to that shown in my prior United States Patent No. 1,944,674, issued January 23, 1934, and hence need not be described in detail here. The rear downwardly bent section 17 of the plate member 15 rests directly on the intermediate portion 14 of the crank axle 11 and is held in position by a pair of generally U-shaped straps 21 and 22 bolted to the section 17, in conjunction with a collar 24 on the left side of the crank axle, suitably fixed thereto, and an arm 25 fixed to the right side of the crank axle. The uppper end (not shown) of the arm 25 is pivotally connected to the rear end of a link 27, the forward end of which is connected with the front wheel structure (not shown) of the plow whereby the front and rear ends are adjusted at the same time, as will be referred to more specifically below. If desired, the collar 24 and arm 25 may be fixed to the crank axle 11 by means permitting lateral adjustment, whereby the lateral position of the crank axle 11 as a whole, relative to the frame 1, may be varied.

A sleeve 31 is fixed, as by welding, to the forward end of the left crank axle section 13 and extends laterally at opposite sides thereof. A shaft 32 is journaled for rotation within the sleeve 31 and at its inner end is formed with or carries an arm 35 which is connected by a link 36 with a bell crank lever 37 pivoted, as at 38, to a bracket 39 mounted on the plate member 15. At its upper end, the bell crank 37 pivotally receives a swivel nut 41 in which the rear threaded end of an adjusting screw 42 is received. The forward end of the adjusting screw 42 is formed with or carries an eye 43 in which the rear looped end 44 of a rotatable adjusting rod 45 is disposed. The adjusting rod 42 is rotatably mounted but held against axial displacement in a trunnion member 42 pivoted to the upper ends of a pair of anchoring brackets 48 which are rigidly connected at their lower ends to the bracket 39. Thus, by turning the rod 45 in one direction or the other, the screw-threaded member 42 is rotated which runs the swivel nut 41 rearwardly or forwardly and thus swings the bell crank 37 and raises the point of anchorage of the link 36 with the frame 1. The laterally outer end of the sleeve 31 is adapted to receive a land wheel (not shown), and the land wheel is adapted to actuate a traction-driven half-revolution clutch which is indicated by the reference numeral 51. The clutch 51 is of conventional construction and hence has been shown only fragmentarily, the clutch including a driven part 52 and suitable mechanism (not shown) which, under the control of a trip lever 53 pivotally mounted on an extension 54 of the crank axle 11, is adapted optionally to connect the driven part 52 with the axle shaft 32, whereby the arm 35 may be swung through approximately a half revolution. Figure 1 shows the clutch arm 35 in one position while Figure 2 shows the same in its other position.

A transverse bearing sleeve 61 is fixed, as by welding, to the forward or swinging end of the other crank section 12 and receives an axle shaft 62 which is of particular formation. The axle shaft 62 includes a horizontal section 63 and a downwardly bent section 64, the latter rotatably receiving a furrow wheel 65. An arm 67 is fixed to the landward end of the axle shaft 62 and has its outer end bifurcated to receive the forward end of a link 68, the latter being pivotally connected to the end of the arm 67 by a pivot pin 69. The upper end of the link 68 is pivotally connected, as at 71, to a fore and aft or longitudinally shiftable adjusting member 73, which has a threaded section passing through an opening in the plate member 15, with lock nuts on opposite sides of the plate member whereby the adjusting bolt 73 may be securely held in position. Preferably, the plate 15 is also provided with a short sleeve or bushing 78 to provide a passage for the adjusting bolt 73.

It will be noted that the link 68 is substantially parallel with the right hand crank axle 12 and of substantially the same effective length, that is, the distance between the points 69 and 71 is substantially the same as the distance between the axis of the intermediate crank axle section 14 and the axis of the sleeve 61, and lines connecting these points are parallel. Therefore, when the crank axle 11 is rocked from the position shown in Figure 1 to the position shown in Figure 2, and in the other direction as well, the link 68 serves to rock the axle or shaft 62 in the sleeve 61 as the crank axle 12 rocks, the effect being to maintain the angled section 64 and the plane of the wheel 65 substantially in a given angular position, it being understood that normally the wheel 65 is inclined or tilted laterally outwardly at the top and that it is arranged so that the plane of the wheel intersects the ground in a line which makes a small angle, to the right or furrowwardly, with respect to the line of advance. Angling the wheel in this manner is commonly referred to giving the wheel more or less "lead," generally toward the plowed ground. In Figure 1 the broken line A indicates the line of advance and the broken line B indicates the intersection of the plane of the wheel 65 with the ground; the angle of lead is shown at $a$. Thus, the parts 12 and 68 serve as generally parallel link means connecting the wheel axle 63 and the plow frame so that whenever the crank axle 11 is swung, as into different operating positions or from an operating position into a transport position (Figure 2 to Figure 1), the angle of inclination of the wheel 65 is not varied, and also, since the angle of inclination of the wheel 65 is not varied it is likewise true that the angle of lead of the wheel 65 is not varied. However, if it should be desired to adjust the angle of lead of the wheel 65, all that it is necessary to do is to loosen the lock nuts 76 and adjust the pivot bolt 73 either forwardly or rearwardly to cause the plane of the wheel 65 to make a different horizontal angle with respect to the longitudinal axis of the implement. After the proper adjustment has been secured the lock nuts 76 are tightened whereby during subsequent swinging of the crank axle 11, the link 68 serves to maintain the angular position of inclination and lead of the wheel 65 substantially constant. It will be understood that the depth of plowing is normally adjusted by turning the rod 45 to raise or lower the link 36, the operating position of the implement being shown in Figure 2.

A modified form of the present invention, more particularly adapted for the heavier plows, is illustrated in Figures 3 et seq. In this form of the invention the plow frame, indicated by the reference numeral 81, includes two angle members 82 and 83 arranged back to back and spaced apart to receive a plurality of disk standards 84. The flanges of the angle irons 82 and 83 are apertured to receive attaching bolts 86 and 87, the latter being a long bolt extending between the angles and serving as a pivot to connect the rear ends of the angles to the rear frame 89. The frame 89 includes a pair of rearwardly divergent angles 91 and 92 connected together at their forward ends by a plate 93 that is welded to the angles 91 and 92. The plate 93 is provided with an opening receiving the bolt 87, and slots are also formed in the plate 93 to receive the bolts 86 which, when loosened, permit the frame 81 to be angled or shifted laterally about the pivot bolt 87 relative to the rear frame 89. The two parts are held in adjusted position by an eyebolt 95 which at one end is anchored to one of the bolts 86 and at the other end is connected with a lug 97 secured to the frame 89. The rear ends of the rearwardly divergent frame angles 91 and 92 are connected together by a cross bar 99 which preferably is welded to the horizontal and/or vertical flanges of the angles 91 and 92. The angle bar 92 is bent at its rear end, as at 101, so as to provide a section that extends parallel to the rear end of the other bar 91, the cross bar 99 being welded to the bar 92 just rearward of the bent portion thereof, as best shown in Figure 5.

The rear frame 89 carries a single piece crank axle indicated in its entirety by the reference numeral 105, the crank axle including a land wheel crank section 106 and a furrow wheel crank section 107. A casting 108 including a sleeve section 109 is secured to the forward end of the land wheel crank axle section 106, and associated with the member 108 is a half-revolution clutch unit 111 of conventional construction, controlled by a trip lever 112 and receiving power from a traction land wheel 113. By means of the half-revolution clutch unit 111, the land wheel 113 serves to drive a shaft 114 on the inner end of which is a crank arm 115. The outer end of the latter is connected by a link 117 with an arm 118, and the arm 118 is connected with a sleeve 119 that is mounted on the intermediate portion 121 of the crank axle 105 and extends through a left-hand bearing unit 122 suitably connected with the rear end of the angle 92. The other end of the sleeve 119 has secured thereto an arm 125 to the upper end of which an adjusting crank screw unit 126 is connected. The particular details of the adjusting screw unit 126 will be referred to below.

Figure 6:
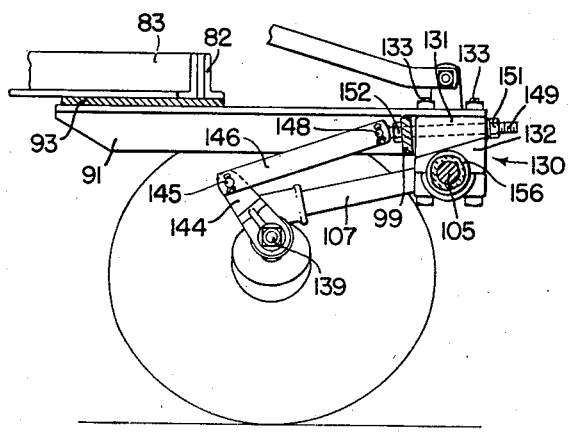
Figure 6 is a section taken generally along the line 6—6 of Figure 4.

The intermediate portion 121 of the crank axle 105 is rockably received in a bearing unit 130 carried at the rear end of the angle 91, the bearing unit comprising two parts 131 and 132 as best shown in Figure 6. Bolts 133 serve to hold the two sections together and also connect both of them to the rear end of the angle 91.

Secured to the lower or forward end of the right hand crank axle section 107 is a sleeve casting 137, the sleeve section proper being indicated at 138 and receiving a shaft 139 having a downwardly and rearwardly bent section 141 on which the rear furrow wheel 142 is journaled for rotation. Secured to the other end of the shaft 139 is an arm 144 carrying a pivot pin 145 by which a link 146 is connected to the arm 144. The link 146 extends generally upwardly and rearwardly and at its upper end is apertured to receive a pivot pin 148 which passes through the eye of a generally fore and aft or longitudinally shiftable eyebolt 149. As best shown in Figure 6, the eyebolt 149 extends at an angle through the upper half 131 of the bearing unit 130, the angle being such that, when the plow is in operating position with the crank section 107 almost but not quite horizontal, fore and aft movement of the eyebolt 149 is effective to rock the shaft 139 in order to adjust the lead of the furrow wheel 142. A pair of lock nuts 151 and 152 serve to adjustably fix the eyebolt 149 in position. A collar 156 is secured, as by welding, to the crank axle at one side of the bearing unit 130, and at the other side thereof an arm 157 is welded to the crank axle and extends generally upwardly. The upper end of the arm 157 is apertured and receives a pivot bolt 161 by which the rear end of the link 162 is connected therewith. The link 162 extends generally forwardly of the plow and is connected with the front wheel structure (not shown).

The adjusting screw unit 126, which is shown in detail and claimed in my United States divisional application, Serial No. 533,047, filed April 27, 1944, comprises an eyebolt 171, the eye of which is apertured to receive a pivot pin 172 carried at the upper end of the arm 125. The bolt 171 is threaded for the greater part of its entire length and extends into a rotatable housing indicated in its entirety by the reference numeral 175. The rotatable housing 175 comprises a rear sleeve section having a nut-receiving chamber 177 and a socket at the rear end. The socket receives a sleeve 179 which is disposed about the bolt 171 and is held in place in the socket by a short bolt 181, the threaded end of which is screwed into a nut seated in a recess formed in the upper portion of the socket.

The other part of the housing 175 comprises a cap section 191 threaded interiorly so as to be screwed onto the front end of the rear housing section. The two sections of the housing 175 are held against relative displacement by a bolt or the like. The two housing sections are provided with a pair of shoulders spaced apart so as to receive therebetween a swivel member 199 having a pair of oppositely arranged trunnions pivotally mounted in a pair of bracket members 205 bolted, as at 206, to an upstanding lug 207 secured as by welding to the angle member 92. The attaching loop portion 192 of the cap section 191 receives an eye 209 that is bolted to the rear end of a rotatable adjusting rod 211 the forward end of which is supported on the plow frame in a position to be accessible to the operator on the tractor by which the plow is propelled.

As will be apparent from Figure 4, the swivel 199 is held by the trunnions 201 against rotation but accommodates the rotation of the housing 175. The eyebolt 171 is held against rotation by virtue of its connection through the pivot pin 172 with the arm 125. Therefore, whenever the adjusting rod 209 is rotated, the housing 175, including the nut member therein, is rotated and thus retracts or extends the eyebolt 171 relative thereto in a generally longitudinal direction, whereby the sleeve 119 and the arm 118 may be pivoted in one direction or the other, thus raising or lowering the link 117 and, with it, the crank axle 105. This mechanism is utilized to adjust the operating position of the plow disks, increasing or decreasing the depth of penetration thereof. By pulling forward on a cable connected to the trip lever 112, the half-revolution clutch mechanism may be actuated to rotate the arm 115, thus swinging the crank axle between its operating and its transport positions. During such swinging movement of the crank axle, both for changing the depth of penetration and for raising or lowering the plow into or out of its transport position, the link 146 and associated parts serve to maintain the angle and lead of the rear furrow wheel 142, which, particularly referring to the lead of the wheel 142, may readily be adjusted by the bolt 149 and the lock nuts 152. It will be noted, particularly from Figure 3, that when the plow is in its transport position the link 146 is in a position substantially at right angles to the axis of the bolt 149. However, when the plow is in its operating position (Figure 6) the bolt and link are substantially in straight line relation. The result of this particular arrangement is this: The lead of the furrow wheel 142 may be varied as soil conditions require by shifting the bolt 149 in one direction or the other, increasing the lead when the ground is hard and reducing the lead when the ground is soft. However, when the plow is raised into its transport position all of the lead should be taken out of the wheel so that, in effect, it runs parallel to the land wheel 113. The points of connection of the link 146 with the bolt and the arm 144 and the angular disposition of the other parts are such that when the plow is raised into its transport position the lead of the wheel 142 is zero, regardless of the particular position of adjustment of the bolt 149. In other words, regardless of the amount of lead in the wheel 142 when the plow is in operating position, when the plow is raised the lead of the wheel 142 returns to zero. This I believe to be broadly new.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a plow, a support, a furrow wheel normally disposed at an angle to the line of advance and at an angle to the vertical, parallel link means connecting said furrow wheel with said support accommodating the raising and lowering of said wheel relative to said support and serving to maintain said angles substantially constant, and means for shifting one of said links to adjust at least one of said angles.

2. In a plow, a plow-carrying structure, a furrow wheel therefor, a crank axle connected with said plow-carrying structure for swinging movement to carry the swinging end generally toward and away from said structure, a part connected with the swinging end of said crank axle and rockable about a transverse axis relative thereto, said part including an outwardly and downwardly angled section upon which said furrow wheel is journaled, and means for rocking said part relative to said crank axle.

3. In a plow, a plow-carrying structure, a furrow wheel therefor, a crank axle connected with said plow-carrying structure for swinging movement to carry the swinging end generally toward and away from said structure, a part connected with the swinging end of crank axle and rockable about a transverse axis relative thereto, said part including an outwardly and downwardly angled section upon which said furrow wheel is journaled, and means for rocking said part relative to said crank axle as the latter is swung relative to said structure so as to maintain the horizontal angle of said furrow wheel substantially constant.

4. In a plow, a plow-carrying structure, a furrow wheel therefor, a crank axle connected with said plow-carrying structure for swinging movement to carry the swinging end generally toward and away from said structure, a part connected with the swinging end of said crank axle and rockable about a transverse axis relative thereto, said part including an outwardly and downwardly angled section upon which said furrow wheel is journaled, and means for rocking said part relative to said crank axle when the latter is in a stationary position so as to adjust the horizontal angle of said furrow wheel.

5. In a plow, a support, a single U-shaped rear axle pivotally connected at its intermediate section with said support and having, generally downwardly and forwardly extending crank sections, a land wheel journaled on one of said sections, a transverse bearing sleeve fixed to the other section, an axle having a downwardly angled part and a transverse part, the latter being rockably disposed in said bearing sleeve, an arm fixed to the inner end of said transverse axle part, a furrow wheel journaled on the downwardly angled part of said axle, and a link pivoted to said arm and to said support in a position generally parallel with respect to said other rear axle section.

6. In a plow, a support, a crank axle pivotally connected with said support and having a generally downwardly and forwardly extending section, a transverse bearing sleeve fixed to the lower end of said section, an axle having a downwardly angled part and a transverse part, the latter being rockably disposed in said bearing sleeve, an arm fixed to the inner end of said transverse axle part, a furrow wheel journaled on the downwardly angled part of said axle, and a link pivoted to said arm and to said support in a position generally parallel with respect to said downwardly and forwardly extending section.

7. In a disk plow, a rear end construction comprising a swingable crank axle, a furrow wheel carried thereby and swingable therewith between working and transport positions, and means for reducing the amount of lead of said wheel as said wheel and crank axle are swung into their transport position.

8. In a disk plow, a rear end construction comprising a swingable crank axle, a furrow wheel carried thereby and swingable therewith between working and transport positions, means for adjusting the lead of said wheel when the latter and said crank axle are in operating position, and means for reducing the lead of said wheel substantially to zero as said wheel and axle are swung substantially into their transport position.

9. An agricultural implement comprising a support, an axle shaft member connected therewith and comprising angularly related sections, bearing means receiving said axle shaft member and receiving one of said sections, a wheel journaled on the other axle section, and means for rotating said axle shaft member to change the angle of said wheel.

10. An implement as defined in claim 9, further characterized by a member pivoted to said support for connecting said axle shaft member thereto, and said axle rotating means comprising a link disposed generally parallel with said pivoted member.

11. A rear end construction for plows and the like, comprising frame means, a single piece crank axle having a land wheel section and a furrow wheel section, means rockably connecting the intermediate portion of said crank axle with said frame means, a land wheel journaled on said land wheel section of said crank axle, a furrow wheel, a movable part connecting said furrow wheel with the furrow wheel section of said crank axle and disposing said furrow wheel substantially in a given angular position when the crank axle is in one position, and means operative when said crank axle moves relative to said frame means for varying the position of said part relative to said furrow wheel section of the crank axle.

12. In a plow, a support, a crank axle swingably connected therewith and having a generally downwardly and forwardly extending section, a furrow wheel axle mounted on said section for rocking movement about a generally transverse axis, a furrow wheel journaled on said furrow wheel shaft and disposed in a given angular position, an arm on said shaft, and a link connected between said support and said arm whereby during swinging movement of said crank axle said link acts through said arm and shaft to maintain said wheel in said given angular position.

13. The invention set forth in claim 12, further characterized by means acting through said link for changing the angular position of said wheel.

14. The invention set forth in claim 12, further characterized by said crank axle being swingable between operating and transport positions, and means for adjustably anchoring the upper end of said link to said frame means, said anchoring means comprising a generally longitudinally shiftable member and said link being disposed substantially perpendicular to said longitudinally shiftable member when said crank axle is swung into its transport position.

15. A rear end construction for plows and the like, comprising frame means, a single piece crank axle having a land wheel section and a furrow wheel section, means rockably connecting the intermediate portion of said crank axle with said frame means including a rockable sleeve disposed about said crank axle and receiving a portion of said frame, a land wheel journaled on said land wheel section of said crank axle, a first arm fixed to said sleeve at one side of said frame portion, a second arm fixed to said sleeve at the other side of said frame portion, means connecting said second arm with said crank axle, a furrow wheel, a movable part connecting said furrow wheel with the furrow wheel section of said crank axle and disposing said furrow wheel substantially in a given angular position when the crank axle is in one position, adjusting means acting between said frame means and said first arm for adjusting said crank axle and both of said land and furrow wheels, and means operative when said crank axle moves relative to said frame means for varying the position of said movable part relative to said furrow wheel section of the crank axle.

CARL G. STRANDLUND.